Sept. 27, 1966 W. R. PITTS 3,275,255

REEL MOUNT

Filed Sept. 16, 1963 2 Sheets-Sheet 1

INVENTOR.
WARREN R. PITTS

BY Fred Jacob

ATTORNEY

Sept. 27, 1966 W. R. PITTS 3,275,255

REEL MOUNT

Filed Sept. 16, 1963 2 Sheets-Sheet 2

INVENTOR.
WARREN R. PITTS

BY Fred Jacob

ATTORNEY

United States Patent Office 3,275,255
Patented Sept. 27, 1966

3,275,255
REEL MOUNT
Warren R. Pitts, Needham, Mass., assignor to Honeywell Inc., a corporation of Delaware
Filed Sept. 16, 1963, Ser. No. 308,999
6 Claims. (Cl. 242—68.3)

The present invention relates in general to new and improved apparatus for supporting and driving reels and in particular to a drive hub for interchangeably supporting a plurality of tape reels.

In order for information contained on tape to be read out, e.g. when punched paper tape is read out on a paper tape reader, the tape is initially positioned on a first tape reel and is transferred during the readout process to a second tape reel which has rotary power applied thereto in the direction of tape motion. During the readout process, the tension in the paper tape serves to unwind the first tape reel, such tension being maintained constant by the application of a drag torque in the opposite direction to the first reel. If, for some reason, the tape is to be rewound onto the first reel, the process is reversed, the rotary driving power being applied to the first paper tape reel and the drag torque being applied to the second paper tape reel.

In certain data processing applications information reduced to punched paper tape arrives at varying intervals. For example, in a large retailing operation a single computer may be employed to process data relative to re-orders, styles and sizes of a particular article of apparel, as the data in the form of punched paper tape is received from the various retail outlets. Characteristically, this information will consist of relatively short lengths of paper tape which are subsequently spliced together as they are spooled onto a tape reel which is rotated by hand or otherwise. As much as 2,000 feet of paper tape may be spooled on a single reel which, when full, is mounted on the paper tape reader where the information is read out in the process of transferring the punched tape to a second reel. The read out information is either stored magnetically or fed directly to the computer for processing. When tape readout is completed, the first tape reel is removed and may then again be used to splice tape, as described above.

In order to prevent an enforced period of idleness of the paper tape reader while tape is being spliced and spooled onto the first reel, a number of such reels are generally in use at any given time. To this end, it is necessary that the hub, hereinafter referred to as the drive hub, which supports and applies a drag torque to the first tape reel during tape readout, or which drives the first tape reel in the opposite direction during rewind, be capable of readily accepting and releasing different tape reels. During the readout or rewind operations the drive hub must securely support the reel to prevent its axial dislodgment. It must also prevent relative rotational movement of the reel to the extent the latter is permitted by the keying arrangement employed, since this may affect the readout operation and cause chatter or noise.

In prior art equipment, the positioning of the tape reel on the drive hub, or its removal, is often attended by an expenditure of time that is incompatible with the efficient use of the equipment. Where a large amount of tape is to be carried by the reel, its construction is often such that the application of an undue amount of physical force is required for its removal or installation. Frequently, the complexity of such equipment makes it costly to manufacture.

Accordingly, it is the object of the present invention to provide a hub for supporting and driving a reel which is not subject to the foregoing disadvantages.

It is another object of the present invention to provide a drive hub adapted to permit the rapid interchange of tape reels.

It is a further object of the present invention to provide a drive hub which is simple and economical in construction for securely and interchangeably supporting reels thereon.

The foregoing objects are attained in the present invention by taking advantage of the fact that in a heavy-duty reel the forces tending to dislodge the reel in an axial direction are relatively slight and are due generally to either an unbalance caused by improper mounting, or to the inadvertent application of an axial force. Thus, once a driving force or a drag torque is applied to the reel by a keyed arrangement in the present invention, it requires only a relatively slight amount of force to prevent the reel from being axially dislodged or to prevent the aforesaid noise or chatter. In the present invention such a force is advantageously applied in a radial direction to the interior surface of the reel hub, thereby greatly simplifying the construction of the drive hub and its cooperating handle. In addition, markings are applied to the front face of the handle in the present invention to tell the observer at a glance whether or not the reel is locked onto the drive hub.

These and other objects of the present invention, together with further features and advantages thereof will become apparent from the following detailed specification and the associated drawings in which.

Figure 1:
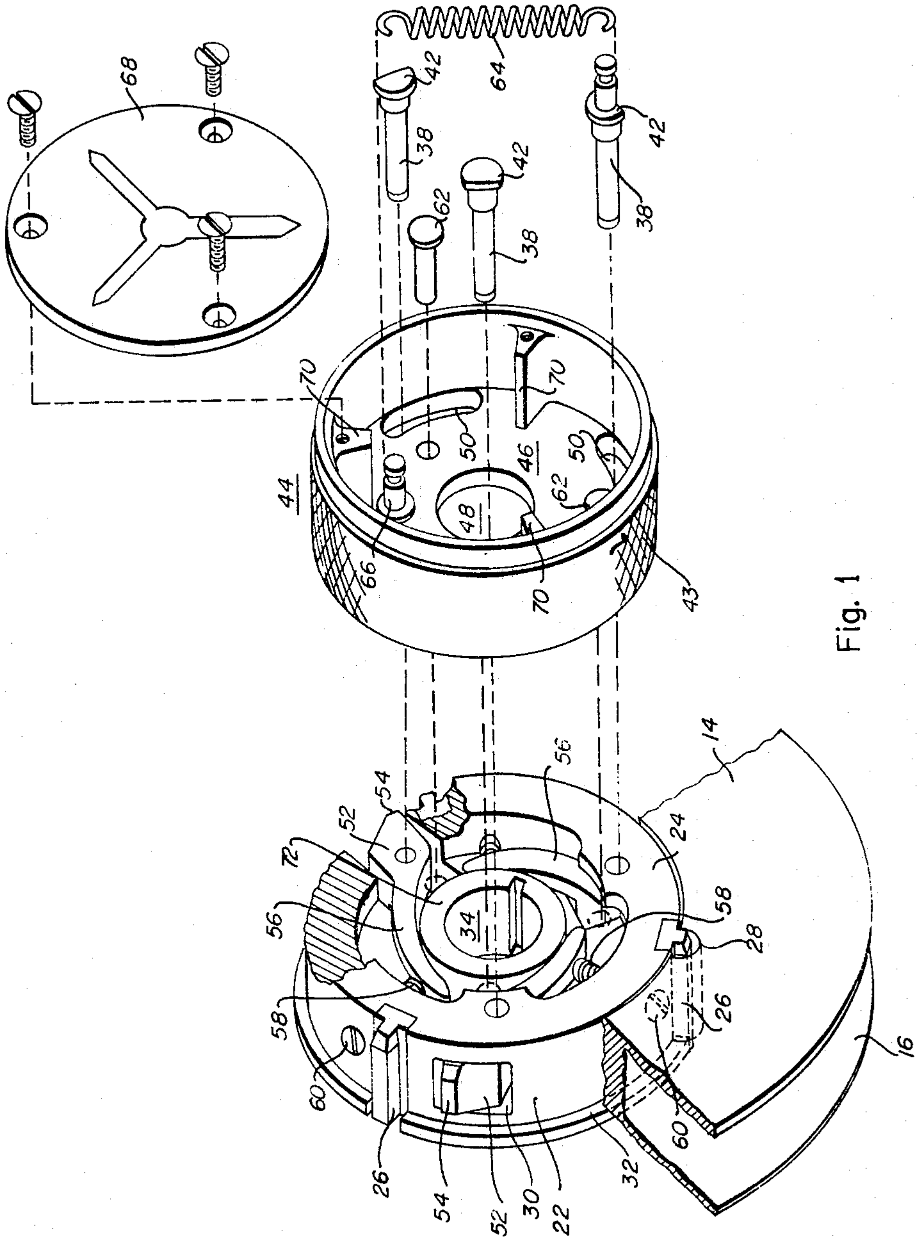
FIGURE 1 is an exploded view of a preferred embodiment of the present invention.

With reference now to the drawings, the reel 10 is seen to include an annular reel hub 12, as well as a face disc 14 and a back disc 16 for retaining the tape 18, which is spooled on the reel hub 12, in position. The annular reel hub 12 has an inner surface 20 which slidably engages the outer cylindrical surface 22 of a drive hub 24. The drive hub further contains keys 26 which are spaced at 120° intervals around its periphery adapted for sliding engagement with mating keyways 28 in the annular reel hub 12. The outer surface 22 of the drive hub further includes openings 30 which are similarly spaced at 120° intervals around its periphery.

When the reel is in its mounted position as shown in the drawings, it abuts the flange plate 32 of the drive hub. The latter further contains a coaxial bore 34 that receives a drive shaft 36. Rotary power, or a drag torque, may thus be transmitted from the drive shaft 36 to the reel by way of the drive hub to which it is keyed. Three pivot pins 38 are positioned at 120° intervals around the common axis parallel thereto and are anchored at one end in the hub 24 by means of a retaining ring 40 at the rear of the flange plate 32. Each pivot pin further includes a lip 42 at the other end.

A hollow cylindrical handle 44 preferably has a knurled exterior gripping surface 43 whose diameter is smaller than that of the outer drive hub surface 22 so that the handle readily slips through the bore 20 when the reel 10 is removed from the drive hub. At the rear of the handle 44 there is an end plate 46 with a circular bore 48 that accommodates the end of the drive shaft 36. The end plate 46 further includes three arcuate slots 50 which are spaced at 120° intervals about the common axis. Each of the pivot pins 38 extends through a slot 50, the lip 42 overlapping the slot so as to retain the handle axially in position with respect to the drive hub 24. Limited rotation of the handle 44 with respect to the hub 24 is possible, as determined by the length of the arcuate slots 50.

Each pivot pin 38 carries a cam 52 rotatably disposed thereon. Each cam includes a beveled contact surface 54, as well as an arm 56 which has outer and inner arcuate surfaces. The drive hub 24 further carries a compression spring 58 corresponding to each cam, which contacts the outer arcuate cam arm surface. A set screw 60 is associated with each of the compressed springs 58 to adjust the pressure created by the latter.

Figure 2:
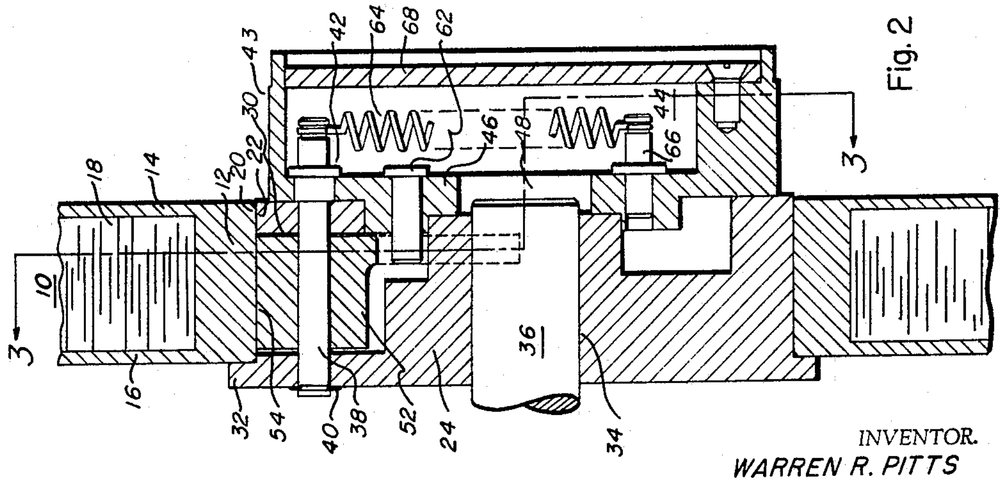
FIGURE 2 is another view of the same embodiment taken along line 2—2 of FIGURE 3.

The end plate 46 of the handle 44 carries three cam follower pins 62, each adapted to contact one arcuate inner cam arm surface. An over-center spring 64 is attached to one of the pivot pins 38, as well as to an anchoring pin 66, as shown in FIGURE 2. The front portion of the handle 44 is terminated by an indicator plate 68 which is supported on the handle ribs 70. The plate 68 carries arrow markings referenced to the keyways 28 of the reel 10, as shown in FIGURE 1, to indicate the relative rotational displacement between the handle and the drive hub.

The function of the over-center spring 64 is to retain the handle 44 in one or the other extreme rotational positions relative to the hub 24, as determined by the extremities of the arcuate slots 50. In the position indicated in heavy lines in FIGURE 3, the pivot pins 38 are at the extreme counter-clockwise end of each of the arcuate slots 50, so that each cam follower pin 62 is out of contact with the inner arcuate surface of the corresponding cam arm 56. The tension of the spring 64 maintains the handle in position with respect to the drive hub 24. In the extreme clockwise handle position shown, each compression spring 58 bears against the outer arcuate surface of the corresponding cam arm 56 to rotate the latter in a counter-clockwise direction about the pivot pin 38. This action causes the beveled contact surface 54 of the cam 52 to protrude through the opening 30 beyond the outer cylindrical surface 22 of the drive hub 24, thereby effectively expanding the outer hub perimeter.

Figure 3:
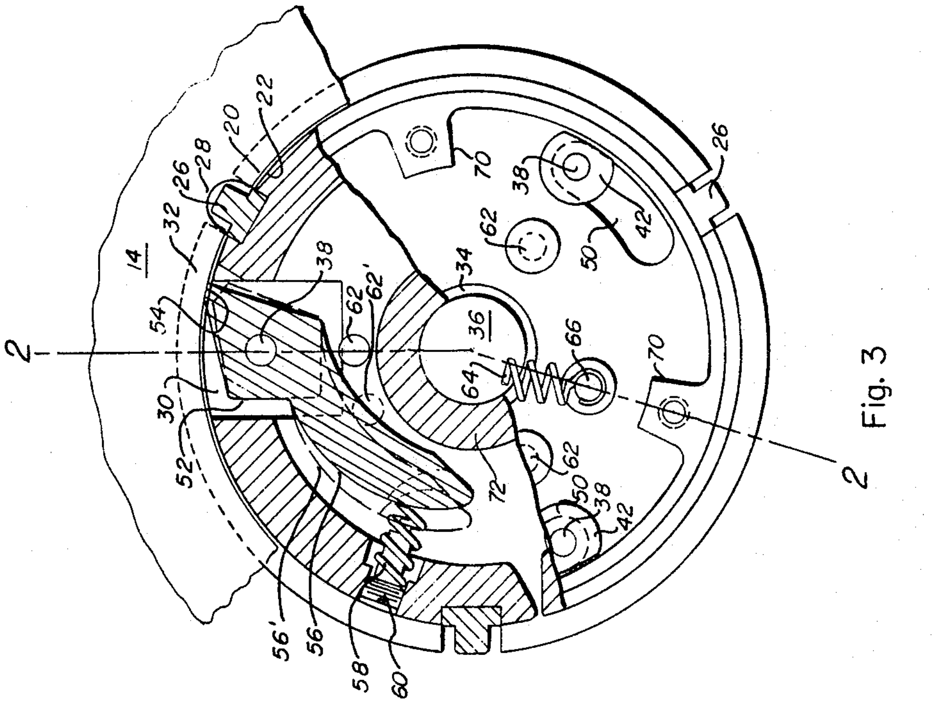
FIGURE 3 is a further view of the preferred embodiment of the invention taken along line 3—3 of FIGURE 2.

A boss 72 limits the pivotal movement of each cam 52 in the absence of the tape reel 10 on the drive hub. When the latter is in its mounted position, however, as shown in FIGURE 3, the beveled contact surfaces 54 engage the inner surface 20 of the annular reel hub 10 to provide a positive locking action between the drive hub 24 and the reel 10. This action not only prevents the tape reel from being dislodged from the drive hub due to unbalance or due to the inadvertent application of an axial force to the reel, but it also prevents the "play" or free space between the keys 26 and the keyways 28, which is required by the sliding fit, from "chattering" during the operation when stops or a reversal of rotation may be required. The aligned position of the arrow markings on the indicator plate 68 with respect to the keyways 28 tell the observer at a glance that the reel 10 is locked onto the drive hub 24.

When it is desired to remove the reel, the handle 44 is turned counter-clockwise to the extent permitted by the length of the arcuate slots 50. This action moves the cam follower pins 62 to the position indicated in dotted outline at 62' to bear against the inner arcuate surface of the cam arm. The force of the cam-follow pin against the cam arm, aided once the center is passed by the action of the tension spring 64, urges the cam arm to the position 56' in opposition to the force exerted by the compression spring 58. The pivotal motion thus imparted to the cam 52 causes the beveled contact surface 54 to retract within the opening 30, out of engagement with the interior reel bore surface 20. This condition is visibly indicated to the observer by the fact that the arrow markings on the indicator plate no longer point to the keyways 28 of the reel 10. The reel, if empty at this time, may be removed by sliding it off the drive hub 10 and over the handle 44. A tape-carrying reel may be substituted which is again locked in position by a clockwise movement of the handle 44.

From the foregoing description and illustration of a preferred embodiment of the invention it will be clear that a drive hub has been provided for supporting a reel in driving relationship, which may be quickly mounted or removed with a minimal amount of force and which is simple in construction and economical to manufacture. Numerous modifications, changes and equivalents may now occur to those skilled in the art, all of which fall within the true spirit and scope contemplated by the invention.

What is claimed is:

1. A hub for supporting a reel thereon and transmitting rotary power thereto, comprising an outer hub surface slidably adapted to engage a corresponding interior surface of said reel in keyed relationship, a back stop at one side of said hub adapted to abut said reel in its mounted position, a plurality of pivot pins mounted on said hub parallel to the axis of rotation, a handle axially extending from the other side of said hub proportioned to pass through said reel, elongated slots in said handle positioned to receive said pivot pins, said pivot pins and slots cooperating to retain said handle in an axial direction while permitting limited rotational movement thereof with respect to said hub, a cam pivotally mounted on each of said pivot pins including a contact portion, an opening in said outer hub surface corresponding to each of said cams, mean positioned to one side of each of said pivot pins for resiliently urging the associated cam in one direction, cam follower means adapted to contact each of said cams at said one side of the associated pivot pin to urge said cam in the opposite direction when said handle is rotated in one sense with respect to said hub, each of said cams being capable of pivotal movement in accordance with the sense of relative handle rotation to position said cam contact portion either in a position retracted within said outer hub surface, or in a protruding position in engagement with said interior reel surface when said reel is mounted.

2. A hub for supporting a reel thereon and transmitting rotary power thereto, comprising an outer hub surface slidably adapted to engage a corresponding interior surface of said reel in keyed relationship, a back stop at one side of said hub adapted to abut said reel in its mounted position, a plurality of pivot pins mounted on said hub parallel to the axis of rotation, a handle axially extending from the other side of said hub proportioned to pass through said reel, elongated slots in said handle positioned to receive said pivot pins, said pivot pins and slots cooperating to retain said handle in an axial direction while permitting limited rotational movement thereof with respect to said hub, a cam pivotally mounted on each of said pivot pins including a contact surface portion, an opening in said outer hub surface corresponding to each of said cams, means positioned to one side of each of said pivot pins for resiliently urging the associated cam in one direction to cause said contact surface portion to extend through its corresponding opening in engagement with said interior reel surface when said handle is rotated in one sense relative to said hub, cam follower means adapted, when said handle is rotated in the opposite sense relative to said hub, to contact each of said cams at said one side of the associated pivot pin so as to urge said cam in the opposite direction to cause said contact surface portions to retract within said openings to permit the removal of said reel.

3. A hub for supporting a reel thereon and transmitting rotary power thereto, comprising means for slidably engaging said reel in keyed relationship, a plurality of pivot pins mounted on said hub parallel to the axis of rotation, a handle including elongated slots for receiving said pivot pins, said pivot pins and said slots cooperating to retain said handle in an axial direction while permitting limited rotational movement with respect to said hub, a cam pivotally mounted on each of said pivot pins and including a contact portion, each of said cams normally occupying a first pivotal position when said handle is rotated in a first sense with respect to said hub, cam follower means adapted to urge each of said cams to a second pivotal position when said handle is rotated in the opposite sense with respect to said hub, said cam contact portions engaging said reel in one of said cam positions.

4. A drive hub for removably supporting a reel thereon and transmitting rotary power thereto, comprising a cylindrical outer hub surface slidably adapted to engage a mating interior surface of said reel, means for keying said hub to said reel through said surfaces, a flange plate terminating one side of said hub and adapted to abut said reel in its mounted position, a cylindrical handle co-axially extending from the other side of said hub and having a diameter less than that of said outer hub surface, said handle including an end plate facing said hub comprising a plurality of arcuate slots spaced about the handle axis, a plurality of pivot pins mounted on said flange plate each extending parallel to said axis through one of said slots and being adapted to retain said handle in an axial direction while permitting rotational movement thereof relative to said hub between two slot-determined limits, a cam mounted on each of said pivot pins, each of said cams including an arm and a contact surface portion disposed on opposite sides of said pin, an opening in said outer hub surface corresponding to each of said cams, resilient means anchored to said hub and bearing against the arm of each of said cams to one side of the associated pivot pin to urge said cam to pivot about said pin in a first direction, the action of said resilient means being adapted, when said handle is positioned at one of said limits, to cause said cam contact surface portions to extend through their corresponding openings into engagement with said interior reel surface, a cam follower corresponding to each of said cams and anchored to said handle, each of said cam followers bearing against its corresponding cam arm at said one side of the associated pivot pin when said handle is positioned at the other one of its limits to urge said cam to pivot about said pin in the opposite direction, the action of said cam followers being adapted to cause said cam contact surface portions to retract within said openings to permit the removal of said reel from said hub, and an indicator on said handle opposite said end plate containing markings indicative of the relative rotational position of said handle.

5. The apparatus of claim 4 and further comprising means for resiliently retaining said handle at one or the other of said two limits relative to said hub.

6. Apparatus for interchangeably supporting a plurality of tape reels, each of said reels including annular face and back discs carried in spaced parallel relationship by an annular cylindrical reel hub, the interior surface of said annular reel hub containing recessed keyways spaced at 120° intervals about the axis of said reel, a cylindrical drive hub adapted to be fixedly mounted on a drive shaft, keys protruding from the exterior surface of said drive hub spaced at 120° intervals around the axis of rotation, a flange plate defining one side of said drive hub and extending radially beyond said exterior surface, said exterior drive hub surface and said keys being slidably adapted to engage said interior reel hub surface and said recessed keyways respectively to a depth determined by the abutment of said back disc against said flange plate, a knurled cylindrical handle extending co-axially from the other side of said drive hub and having a diameter less than said interior drive hub surface, said handle including an annular end plate facing said other drive hub side and containing arcuate slots spaced at 120° intervals about said axis, a pivot pin extending through each of said arcuate slots to an anchor in said flange plate, said pivot pins axially retaining said handle in position while permitting limited rotational movement thereof relative to said drive hub, an over-center spring anchored to said end plate and to one of said pivot pins adapted to retain said handle at one or the other extreme rotational position relative to said drive hub, openings spaced around said interior drive hub surface each corresponding to one of said pivot pins, a cam pivotally supported on each of said pivot pins, each of said cams including a beveled surface to one side of said pivot pin and an elongated arm disposed on the other side thereof, said arm having outer and inner arcuate surfaces, an adjustable compression spring anchored in said drive hub corresponding to each of said cams and bearing against the outer arcuate cam surface, the force of said compression spring, upon the rotation of said handle in a first sense relative to said drive hub, being adapted to rotate said beveled cam surface through the corresponding opening in said exterior drive hub surface into engagement with the interior reel hub surface, a follower pin anchored in the vicinity of each of said arcuate slots adapted to bear against the inner arcuate arm surface of the corresponding cam, the force of said follower pins against said cam arms, upon the relative rotation of said handle in the opposite sense, opposing the force of said compression springs to retract said beveled cam surfaces within said openings and permit the removal of said reel, and an indicator plate on said handle opposite said end plate containing markings indicative of relative rotational position of the said handle.

References Cited by the Examiner

UNITED STATES PATENTS

| | | | |
|---|---|---|---|
| 1,905,192 | 4/1933 | Talbot | 242—72 |
| 2,154,908 | 4/1939 | Lewis | 279—33 |
| 2,374,244 | 4/1945 | Standish | 242—68.2 X |
| 2,558,055 | 6/1951 | Meredith | 242—72 X |
| 2,779,187 | 1/1957 | Stewart | 279—33 X |
| 2,890,888 | 6/1959 | Damijonaitis | 279—106 |
| 2,960,278 | 11/1960 | Tronslin | 242—68.3 |
| 3,179,450 | 4/1965 | Recker | 279—35 X |

FOREIGN PATENTS

| | | |
|---|---|---|
| 323,085 | 7/1920 | Germany. |
| 1,140,792 | 12/1962 | Germany. |
| 772,318 | 4/1957 | Great Britain. |

JORDAN FRANKLIN, *Primary Examiner.*

M. J. COLITZ, *Assistant Examiner.*